United States Patent [19]
Dufty et al.

[11] Patent Number: 5,468,267
[45] Date of Patent: Nov. 21, 1995

[54] ROLLING APPARATUS

[76] Inventors: Raymond J. Dufty, 466 Brisbane Road, Arundel, Gold Coast, 4214 Queensland; Ronald S. Kaye, 5 Sunbird Avenue, Paradise Point, Gold Coast, 4216, Queensland, both of Australia

[21] Appl. No.: 313,269
[22] PCT Filed: Apr. 1, 1993
[86] PCT No.: PCT/AU93/00140
    § 371 Date: Oct. 3, 1994
    § 102(e) Date: Oct. 3, 1994
[87] PCT Pub. No.: WO93/19582
    PCT Pub. Date: Oct. 14, 1993

[30] Foreign Application Priority Data
    Apr. 1, 1992 [AU] Australia ................. PL1637

[51] Int. Cl.⁶ ............................... A01G 1/12
[52] U.S. Cl. ........................ 47/1.01; 404/123
[58] Field of Search .................. 404/125, 123, 404/122; 47/1.01

[56] References Cited

U.S. PATENT DOCUMENTS 5,046,889  9/1991  Sterner .................... 404/122

FOREIGN PATENT DOCUMENTS

| 236869 | 4/1960 | Australia. | |
|---|---|---|---|
| 61134/73 | 10/1972 | Australia. | |
| 60595/73 | 3/1975 | Australia. | |
| 33622/78 | 8/1979 | Australia. | |
| 50015/79 | 3/1980 | Australia. | |
| 45120/85 | 1/1987 | Australia. | |
| 797849 | 5/1936 | France | 404/122 |
| 2937449 | 3/1981 | Germany | 404/122 |
| 655765 | 4/1960 | Italy | 404/123 |
| 159994 | 8/1957 | Sweden | 404/122 |
| 1395725 | 5/1988 | U.S.S.R. | 404/125 |

Primary Examiner—Henry E. Raduazo
Attorney, Agent, or Firm—Robbins, Berliner & Carson

[57] ABSTRACT

Rolling apparatus (10) for rolling of level surfaces of turf or grass including a mobile main frame (11) and an undercarriage (12) having at least three ground contacting rollers (37, 38, 40) which are all unevenly spaced.

18 Claims, 4 Drawing Sheets 5,468,267

ROLLING APPARATUS

FIELD OF INVENTION

THIS INVENTION relates to an improved rolling apparatus alternatively known in some circles as polishing apparatus suitable for rolling or polishing of level surfaces such as bowling greens, cricket pitches, lawn tennis courts, golfing greens and the like.

BACKGROUND ART

A conventional motorised rolling apparatus is described in Australian Patent Specification 522301 which relates to an undercarriage supported by a pair of ground engaging rollers. There was also provided a main frame also having a third ground engaging roller and drive means for driving one of the rollers so as to propel the rolling apparatus in a line of travel along a surface generally normal to the third roller. Coupling means were provided between the undercarriage and the main frame so as to allow pivotal movement of the undercarriage with respect to the main frame about a generally vertical axis. However, the coupling means was such so as to only allow pivotal movement of the undercarriage with respect to the main frame about a horizontal axis parallel with the direction of travel of the rolling apparatus and not about a horizontal axis normal to the direction of travel. In other words in a x-y-z axis frame of reference pivotal movement of the undercarriage with respect to the main frame could occur about the y axis if the y axis coincided with the direction of travel but not about the z-axis. To this end there were provided levelling bolts which were interposed between the undercarriage and main frame which had to be adjusted constantly so as to ensure that the three rollers were oriented in a common horizontal plane. However, it was found in practice that this was relatively time consuming. Also the rolling apparatus of Patent 522301 was prone to produce corrugations in the surface being rolled if the three rollers were not oriented in the same horizontal plane. It was also considered that the apparatus of Patent 522301 was unduly complicated in construction because of the inclusion of the levelling bolts.

BROAD STATEMENT OF INVENTION

It therefore is an object of the invention to provide rolling apparatus which alleviate the abovementioned disadvantages associated with the prior art.

The rolling apparatus of the invention comprises an undercarriage having at least three ground contacting rollers which are unevenly spaced. There also may be provided an overlying main frame or chassis which is universally pivotally attached to the undercarriage so that the undercarriage is pivotable with respect to the main frame or chassis about any direction. The main frame which is mobile may also be supported by at least one ground contacting roller. There also may be provided drive means which is drivingly connected suitably to the roller of the main frame for propelling or driving the rolling apparatus in a line of travel which is suitably normal to the axis of at least one of the undercarriage rollers. Suitably each of the undercarriage rollers are substantially parallel with each other.

The undercarriage may be formed in any suitable manner and thus may comprise a pair of opposed end frame members or end plates interconnected by a longitudinal which is preferably of channel shape having a pair of opposed substantially vertically oriented flanges and an interconnecting web which is suitably oriented in a horizontal plane. The longitudinal member may function as a strengthening member and may also have a cover plate attached thereto.

Preferably each end frame member has rotatably mounted thereto the at least three unevenly spaced rollers. A horizontal web of the channel cross member may be located above the at least three rollers and more suitably directly above an intermediate roller.

Each of the three rollers may include a longitudinal axle extending the length of each roller which is attached at each end to an associated end frame or alternatively may be provided with stub axles at each end attached to an associated end frame.

In the above described arrangement preferably the undercarriage is located adjacent one end portion of the main frame.

Preferably the drive means is drivingly connected to a main frame ground contacting roller or drive roller and a similar drive means may be utilised as described in Australian Patent Specification 522301 which is mounted on the main frame. However, this is not essential and any suitable drive means may be utilised wherein an engine or motor suitably of the internal combustion type is mounted on a top surface of the main frame.

The motor may have an output shaft drivingly connected to the drive roller of the main frame via suitable gear means or belt-pulley mechanism. However, preferably an output shaft is connected to a pair of opposed pulleys wherein a first pulley is connected to a forward drive train and a second pulley is connected to a reverse drive train as described in Patent 522301.

Suitably drive direction means or belt tensioning means such as rollers mounted on levers as described in Patent 522301 may be utilised to drive a respective drive train. Thus when tension is imparted to a belt connected to the first pulley this may in turn tension a belt attached to the drive roller via a secondary set of pulleys and cause the roller to rotate in forward direction. Tensioning of a belt connected to the second pulley may cause the ground contacting roller to rotate in a reverse direction via a similar operation. In this embodiment the belt attached to the drive roller may have one end drivingly associated with the first pulley and another end drivingly associated with the second pulley. In a neutral position the belt associated with the drive roller may be idling and thus not subject to tension.

The main frame may have any suitable construction and preferably includes a seat for a driver and appropriate steering mechanism as described in Patent 522301. Control rods located adjacent to the seat may cause forward or reverse movement and may be associated with a respective belt tensioning means as described above.

The main frame is also suitably supported by opposed ground engaging wheels located on each side thereof and suitably attached to the main frame by stub axles or other suitable axle means. There also may be provided means for raising or lowering the ground engaging wheels when required for transportation or storage. Thus in one form there may be provided a control frame which may be rectangular in shape wherein each stub axle is directly carried by opposed frame members of the control frame. The arrangement is suitably such that in the lowered position the control frame may be locked in position by suitable locking means such as a locking pin whereby the control frame may be oriented in a horizontal plane which is parallel or common to a base of the main frame. In the raised or elevated position the control frame may occupy a substantially vertical orientation or at an acute angle to the vertical in use and the control frame in this position may abut a stop member associated with the main frame or be locked to the stop member.

Alternatively raising or lowering of the wheels may be achieved as described in Patent 522301.

BRIEF DESCRIPTION OF THE DRAWINGS

Reference may now be made to a preferred embodiment of the invention as shown in the attached drawings wherein.

BEST METHOD FOR CARRYING OUT THE INVENTION

Figure 1:
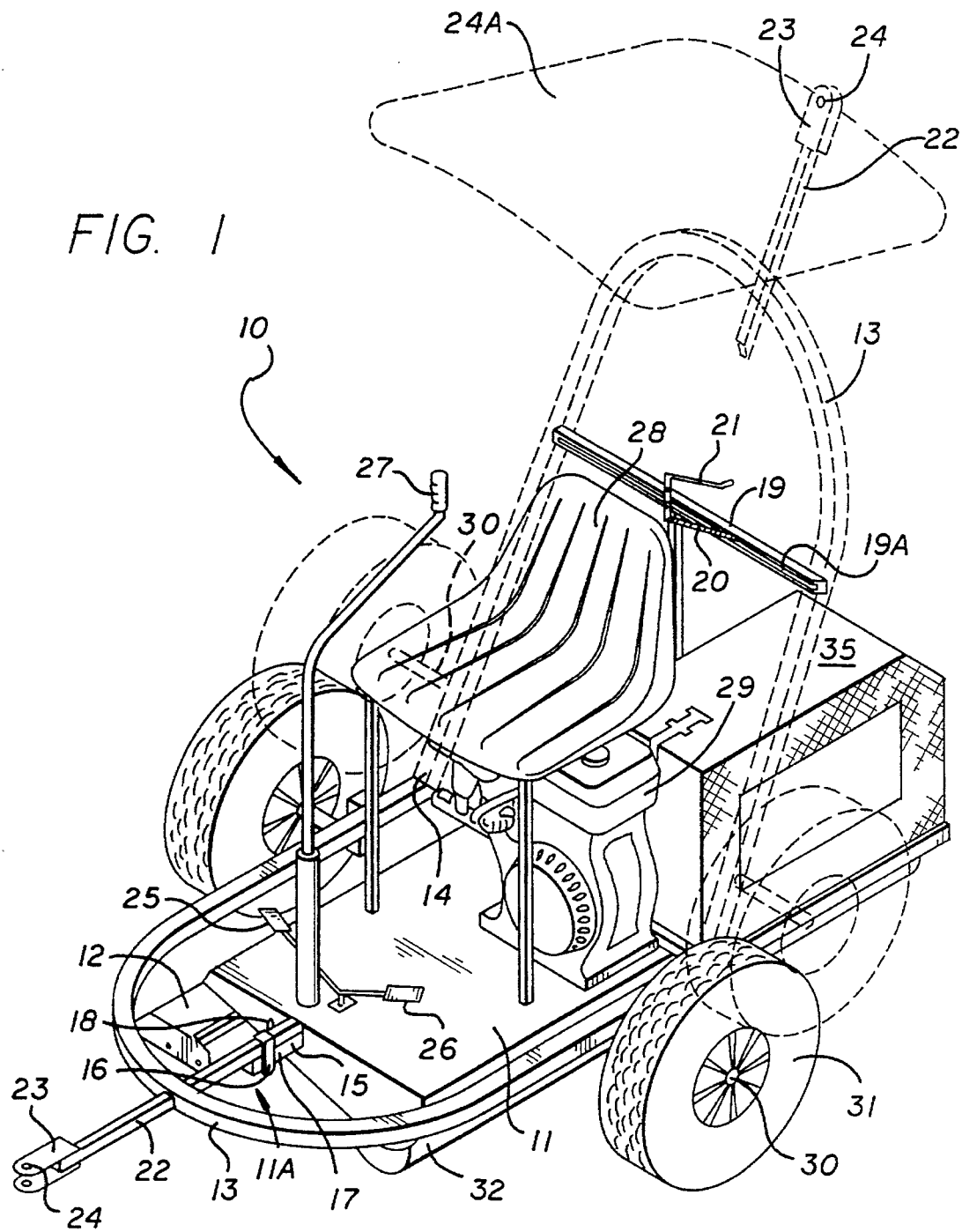
FIG. 1 is a perspective view of rolling apparatus constructed in accordance with the invention illustrating directional control by means of a foot operated mechanism.

The rolling apparatus 10 of the invention suitably is in the form of a vehicle having a main chassis or frame 11, an undercarriage 12 attached to the main chassis 11, a control frame 13 which in the transport position of rolling apparatus 10 is shown as indicated in full outline in FIG. 1 but which may be pivoted to the substantially vertical orientation shown in phantom in FIG. 1 about pivot point 14. In this regard a handle 22 of control frame 13 in the transportation position is located in locking channel 15 fixed to chassis 11 and locked in position by locking mechanism 11A which includes clip 16 biased by spring 17. Upon a rearward movement of tab 18 against the bias of spring 17, control frame 13 may then be released and then be pivoted to the upper position as described above. The control frame 13 may then be locked in the upper position by a locking pin 19A attached to support frame 19. The locking pin 19A is biased by spring 20 which may engage in a mating aperture (not shown) in control frame 13. Movement of locking pin 19 from a locked to an unlocked position and vice versa may be effected by movement of actuating handle 21. Handle 22 may comprise a fixed attachment shaft having a pair of brackets 23 and co-aligned apertures 24 for attachment to a canopy 24A shown in phantom. There is also shown a pair of foot pedals 25 and 26 as well as a steering control handle 27. Seat 28, drive motor 29, wheel axle 30 interconnecting ground engaging wheels 31, drive roller 32 and undercarriage 12 are also shown.

There is also shown rear shroud 35 which is mounted on chassis 11 and which may be utilised to conceal the transmission (not shown).

Figure 2:
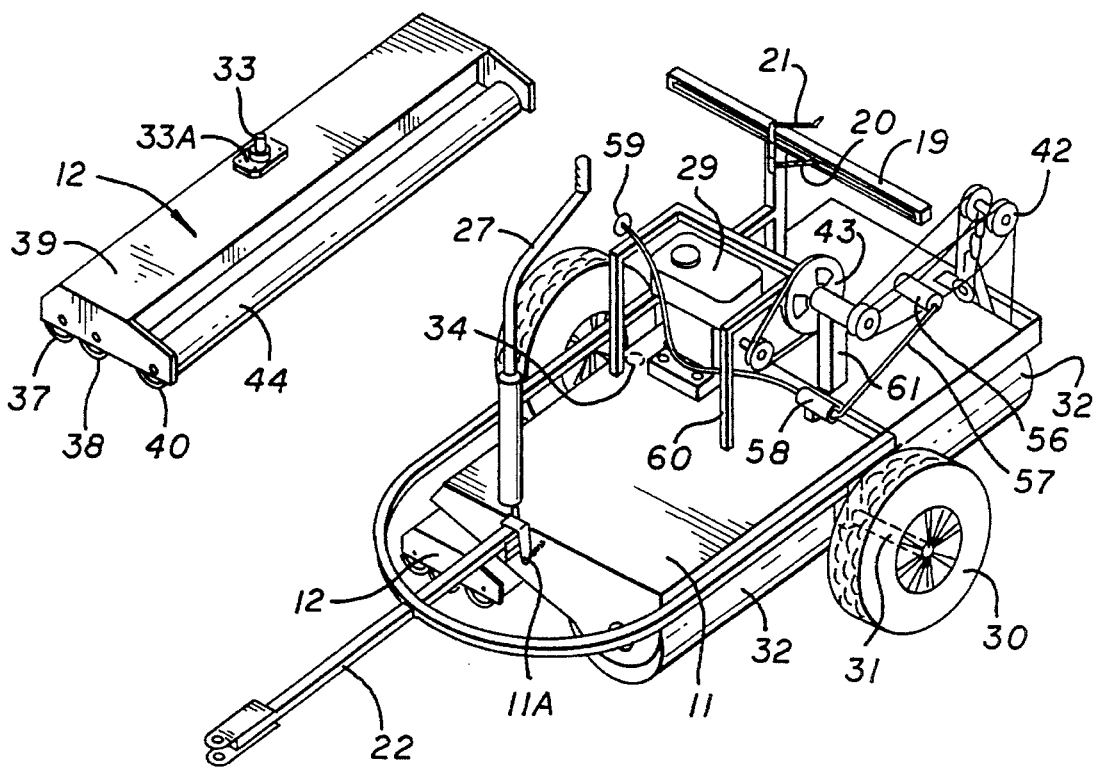
FIG. 2 is a perspective view of rolling apparatus constructed in accordance with another embodiment of the invention illustrating directional control by means of a hand operated mechanism.
Figure 3:
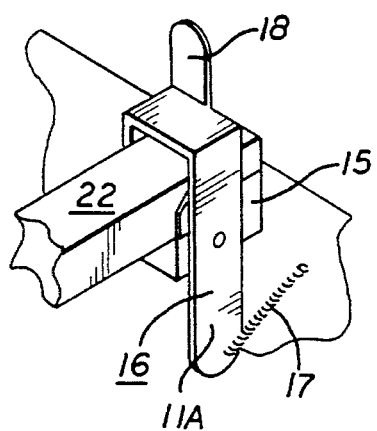
FIG. 3 is a detailed perspective view showing the locking of the control frame showing to the main frame.

In FIG. 2 there is shown another embodiment of the rolling apparatus of the invention which may be utilised for hand controlled forward or reverse movement instead of the foot controlled pedals 25 and 26 shown in FIG. 1.

Figure 4:
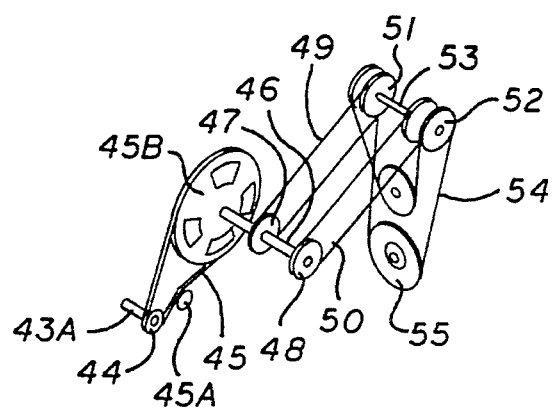
FIG. 4 is a detailed perspective view of the belt drive assembly connected with the hand operated directional control mechanism.

In FIG. 2 similar reference numerals are utilised as in FIG. 1. The undercarriage 12 is shown removed from chassis 11 and has rollers 37 and 38 having a cover plate 39 and roller 40. There is also shown a central self aligning ball race 33 and associated mounting plate 33A to cover plate 39. Ball race 33 engages in aperture 34 of chassis 11 as shown. There is also shown a transmission mechanism 42 for effecting movement of drive roller 32 which is shown in more detail in FIG. 4. This mechanism is driven from motor 29 and includes output shaft 43A, pulley 44 attached to shaft 43A and endless belt 45 which engages idler pulleys 45A and 45B. There is also shown cross shaft 46 interconnecting idler pulleys 45B, 47 and 48, endless belts 49 and 50, pulleys 51 and 52 for supporting belts 49 and 50, cross shaft 53 interconnecting pulleys 51 and 52 and belt 54 supported by pulleys 51 and 52. Each pulley 51 and 52 has a double V shape. Belt 54 drives pulley 55 which is attached directly to an axle 30 of roller 32. Also shown is belt tensioner 56 carried by rod 57 which is supported by bearing 58 attached to chassis 11 which rod is also integral or rigidly attached to control lever 59. Movement of control lever 59 in a forward or reverse direction controls the direction of rotation of roller 32.

Also shown in FIG. 2 are support frame 60 for seat 28 and support block 61 for bearing sleeve 43.

Figure 5:
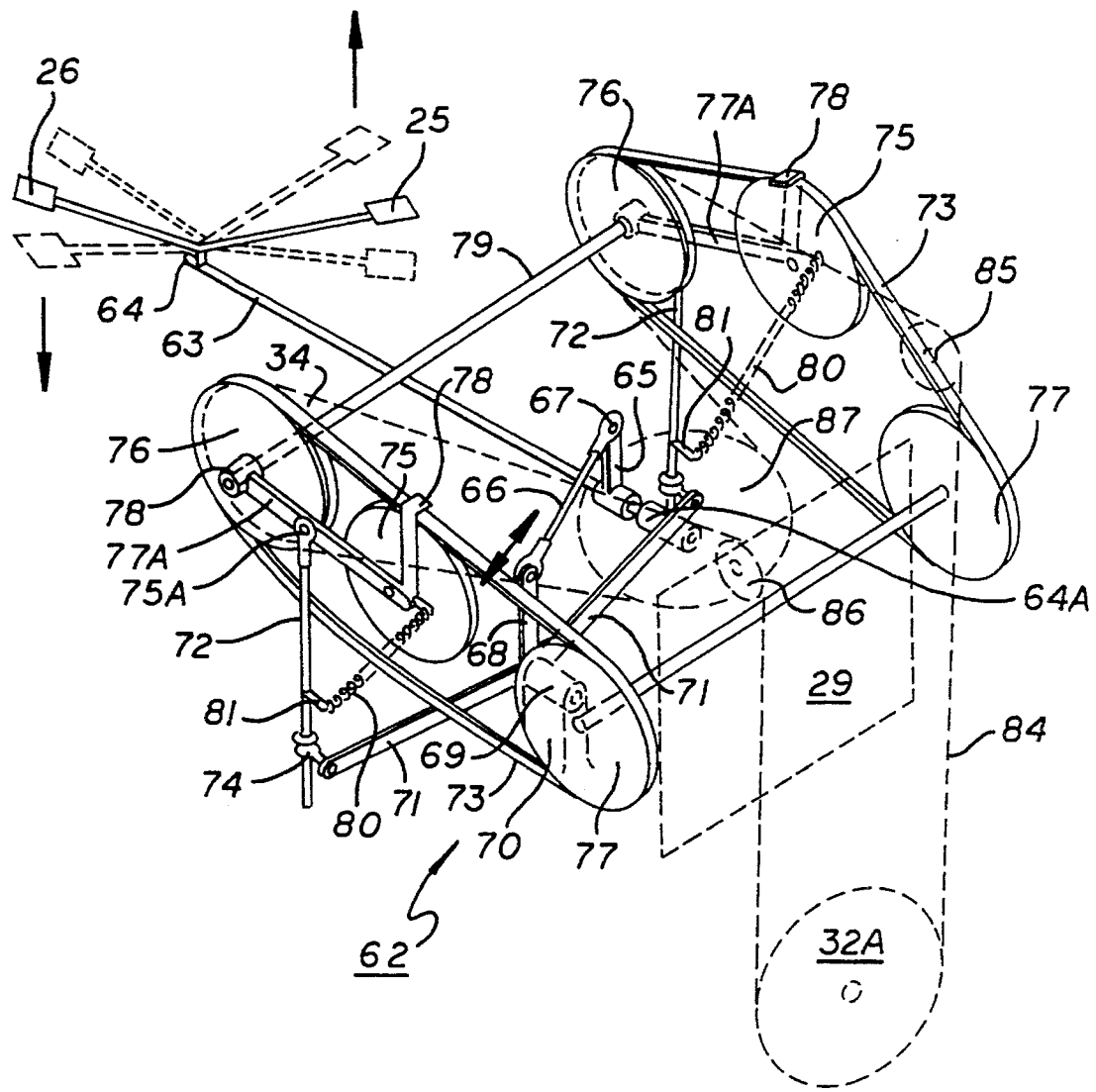
FIG. 5 is a detailed perspective view of a belt drive assembly which may be utilised in the foot operated directional control mechanism shown in FIG. 1.

In FIG. 5 there is illustrated a suitable transmission 62 for effective movement of roller 32 in a desired direction i.e. either in a forward or reverse direction. The transmission 62 includes control rod 63 which is rigidly attached to pedals 25 and 26 at 64. Control rod 63 is supported in a bush (not shown) attached to chassis 11. Control rod 63 is supported in support bush 64A also attached to chassis 11. Rod 63 is rigidly attached to link 65 which is also pivotally connected to rod 66 at 67. Rod 66 is pivotally attached to upright member 68 which is pivotally mounted in bush 69 attached to support block 70 which is fixed to chassis 11. Rod 71 is also rigidly attached to upright member 68 so that as upright 68 moves in either of the directions indicated by the arrow in full outline this will cause movement of tensioner rod 72 and thus move tensioner pulley 75 in either an upward direction to tension belt 73 or a downward direction to slacken belt 73. In this regard the tensioner rod is fixed to cross shaft 77A at 75A. Tensioner rod 72 is fixed to rod 71 at 74. There is also shown fixed pulleys 76 and 77 and belt deflector 78. Cross shaft 77A is pivotally mounted on bearing 78 of fixed shaft 79. Also shown is return spring 80 which is fixed to rod 72 at 81 and cross shaft 77A at 82. Also shown is another shaft 71 rigidly attached to upright 68 which functions in the same manner as the first mentioned shaft 71 in relation to tensioning or slackening of belt 73 on the left hand side of FIG. 5 which is associated with pulleys 76, 77 and movable tensioner pulley 75 located in opposed relationship to the first mentioned set of pulleys 75, 76 and 77 as described above.

It therefore will be appreciated that as pedal 26 is depressed as shown by the arrow in full outline this will cause corresponding upward movement of pedal 25 together with slackening of belt 73 on the left hand side of FIG. 5 and tensioning of belt 73 on the right hand side of FIG. 5.

In this regard both pulleys 76 are double groove pulleys and they also support belt 84 as shown in phantom. Belt 84 also engages with pulleys 85, 86, 87 and drive pulley 32A of roller 32.

Figure 6:
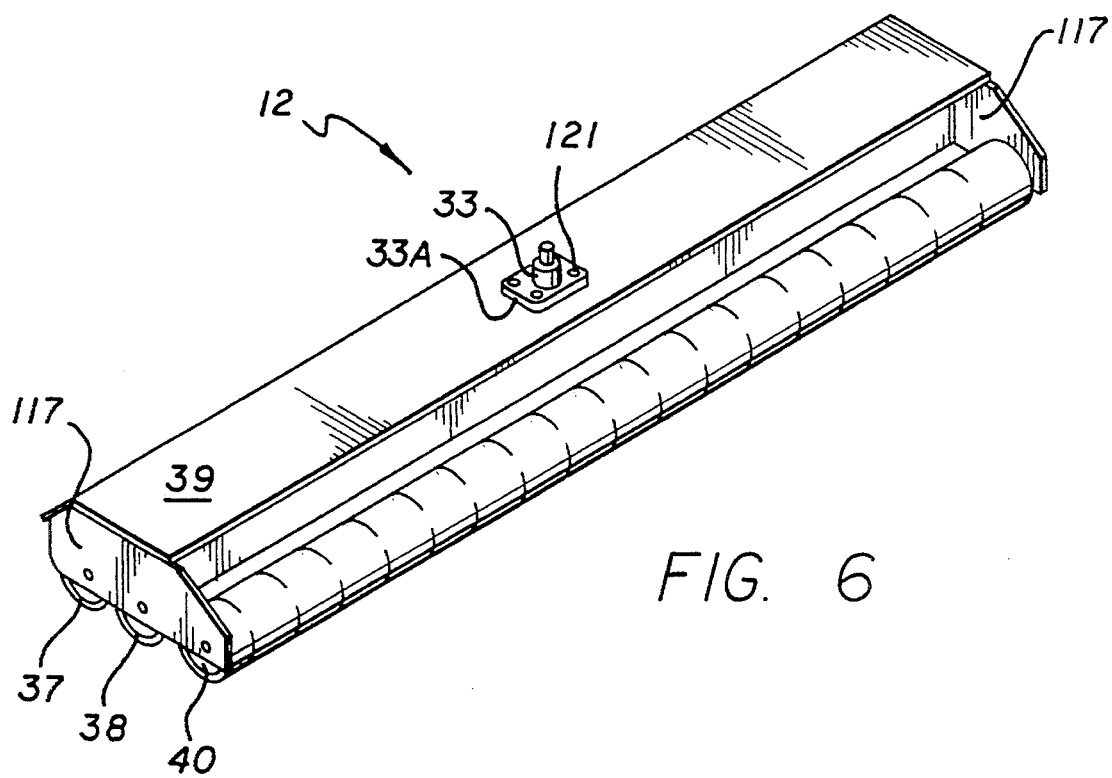
FIG. 6 is a perspective view of the undercarriage utilised in the rolling apparatus of FIG. 1 or FIG. 2.
Figure 7:
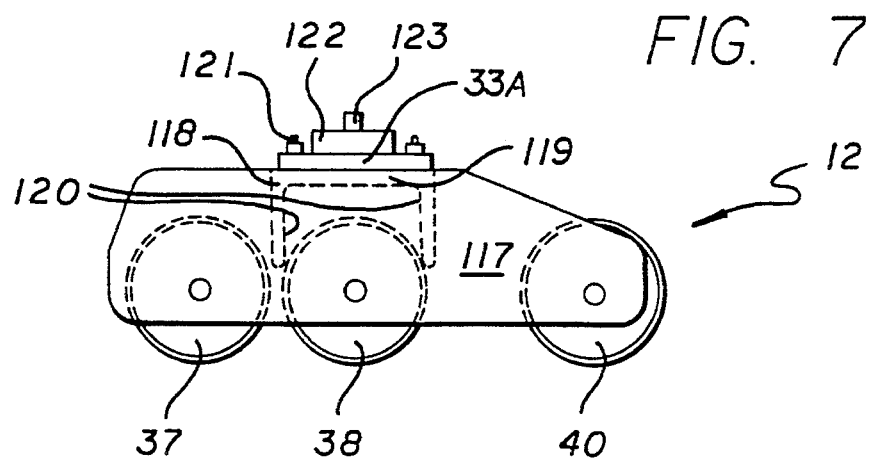
FIG. 7 is an end view of the undercarriage shown in FIG. 9.

In FIGS. 6 and 7 there is shown undercarriage 12 having end plates 117 and cover plate 39. Also shown is a strengthening member in the form of channel shaped member 118 having top web 119 and downwardly extending flanges 120. Central self aligning ball race 33 includes mounting plate 33A attached to undercarriage 12 by bolts 121. Ball race 33 also includes bearing member 122 and central pivot pin 123 which locates in aperture 34 shown in FIG. 2.

It will be appreciated from the foregoing that the main purpose of the rolling apparatus of the invention is to smooth a playing surface of a turf green to thereby eliminate bumps and hollows enabling a ball to run or bounce smoothly and accurately on the playing surface.

The provision of the undercarriage 12 and the use of the unevenly spaced ground contacting rollers 37, 38 and 40 is an appropriate means of steering the main frame 11. The undercarriage 12 is therefore free to move in any direction and may eliminate undulations by the simple means that if a first roller hits a bump it may lift the second roller off the ground increasing the weight on the first roller. When the second roller hits the bump the weight of the first roller may be decreased thus increasing the weight on the second roller. The use of the third roller has a similar effect which smooths out the lawn or turf surface.

Another advantage of the invention is the use of the control frame as shown in FIG. 1 which means that the rolling apparatus of the invention may be transported together with an associated canopy. However, when the control frame and the ground support wheels associated therewith are elevated to an inoperative position this means that the rolling apparatus of the invention may be connected to a prime mover for use as a trailer.

It will also be appreciated that while in the illustrated embodiment the drive means may be an internal combustion engine such drive means can also comprise an electrically operated or hydraulically operated motor.

It will also be appreciated that there are many different lengths of rollers for various purposes. If desired in some circumstances a vibrating roller can be added with little modification to provide greater turf compaction.

We claim:

1. Rolling apparatus for rolling of level surfaces of turf or grass, comprising:
   (i) a mobile main frame; and
   (ii) an undercarriage having at least three ground contacting idler rollers which are unevenly spaced, said undercarriage being pivotally attached by a universal pivot joint to the main frame whereby said undercarriage is pivotable with respect to the main frame in any direction.

2. Rolling apparatus as claimed in claim 1 wherein the main frame includes a ground engaging roller driven by drive means mounted on the main frame.

3. Rolling apparatus as claimed in claim 2 wherein the main frame may be driven in a line of travel normal to the axis of said at least three undercarriage rollers.

4. Rolling apparatus as claimed in claim 1 wherein the undercarriage includes a pair of opposed end frames or plates for supporting each of the unevenly spaced rollers.

5. Rolling apparatus as claimed in claim 4 wherein there is provided a strengthening longitudinal member which is attached to each end frame or end plate.

6. Rolling apparatus as claimed in claim 1 wherein the universal pivot joint is a central self aligning ball race between the main frame and the undercarriage.

7. Rolling apparatus as claimed in 5 wherein the pivot joint is rigidly attached to the strengthening member.

8. Rolling apparatus as claimed in claim 2 wherein the drive means is connected to the driven roller by a transmission assembly which is hand operated to effect a forward or reverse direction.

9. Rolling apparatus as claimed in claim 2 wherein the drive means is connected to the driven roller by a transmission assembly which is foot operated to effect a forward or reverse direction.

10. Rolling apparatus as claimed in claim 8 or 9 wherein the transmission assembly comprises a pair of opposed drive trains wherein each drive train includes an endless belt and each of said endless belts are subject to an associated tensioning means in such a manner that when one of said endless belts is tensioned the other of said endless belts is slack.

11. Rolling apparatus as claimed in claim 1 wherein there is provided a control frame pivotally attached to the main frame, said control frame having a pair of ground engaging wheels wherein the control frame may be pivoted from an operative or transportation position to an inoperative position with the ground engaging wheels clear of the ground.

12. Rolling apparatus as claimed in claim 11 wherein the control frame has an attachment member for supporting a canopy in the operative position.

13. Rolling apparatus for rolling of level surfaces of turf or grass, comprising:
   (i) a mobile main frame;
   (ii) an undercarriage having at least three ground contacting rollers which are unevenly spaced, said undercarriage being pivotally attached by a universal pivot joint to the main frame whereby said undercarriage is pivotable with respect to the main frame in any direction; and
   (iii) a control frame pivotally attached to the main frame, said control frame having a pair of ground engaging wheels wherein the control frame may be pivoted from an operative or transportation position to an inoperative position with the ground engaging wheels clear of the ground.

14. Rolling apparatus as claimed in claim 13 wherein the control frame has an attachment member for supporting a canopy in the operative position.

15. Rolling apparatus for rolling of level surfaces of turf or grass, comprising:
   (i) a mobile main frame including a ground engaging roller driven by drive means mounted on the main frame, wherein the drive means is connected to the driven roller by a transmission assembly which is hand operated to effect a forward or reverse direction and the transmission assembly comprises a pair of opposed drive trains wherein each drive train includes an endless belt and each of said endless belts are subject to an associated tensioning means in such a manner that when one of said endless belts is tensioned the other of said endless belts is slack; and
   (ii) an undercarriage having at least three ground contacting rollers which are unevenly spaced, said undercarriage being pivotally attached by a universal pivot joint to the main frame whereby said undercarriage is pivotable with respect to the main frame in any direction.

16. Rolling apparatus for rolling of level surfaces of turf or grass, comprising:
   (i) a mobile main frame including a ground engaging roller driven by drive means mounted on the main frame, wherein the drive means is connected to the driven roller by a transmission assembly which is foot operated to effect a forward or reverse direction and the transmission assembly comprises a pair of opposed drive trains wherein each drive train includes an endless belt and each of said endless belts are subject to an associated tensioning means in such a manner that when one of said endless belts is tensioned the other of said endless belts is slack; and (ii) an undercarriage having at least three ground contacting rollers which are unevenly spaced, said undercarriage being pivotally attached by a universal pivot joint to the main frame whereby said undercarriage is pivotable with respect to the main frame in any direction.

17. Rolling apparatus for rolling of level surfaces of turf or grass, comprising:

(i) a mobile main frame; and (ii) an undercarriage having at least three ground contacting rollers which are unevenly spaced, said undercarriage having a pair of opposed end frames or plates for supporting each of the unevenly spaced rollers, said undercarriage also including a strengthening member which is attached to each end frame or end plate and there being further provided a universal pivot joint which is rigidly attached to the strengthening member to thereby pivotally attach the undercarriage to the main frame wherein the main frame is pivotable with respect to the main frame in any direction.

18. Rolling apparatus as claimed in claim 17 wherein the universal pivot joint is a central self aligning ball race between the main frame and the undercarriage.

* * * * *